United States Patent Office 2,719,150
Patented Sept. 27, 1955

2,719,150

PROCESS FOR THE MANUFACTURE OF OCTAHYDROISOQUINOLINE DERIVATIVES AND INTERMEDIATES THEREIN

Joseph Hellerbach, Basel, Switzerland, assignor to Hoffmann-La Roche Inc., Nutley, N. J., a corporation of New Jersey No Drawing. Application November 15, 1951, Serial No. 256,623

Claims priority, application Switzerland January 16, 1951

5 Claims. (Cl. 260—240)

It is known (O. Schnider and J. Hellerbach, "Helvetica Chimica Acta," volume 33, year 1950, page 1437) that 1-benzyl-2-alkyl-octahydroisoquinolines of the general Formula VI may be prepared by condensing β-cyclohexene-(1)-yl-ethylamine (I) with substituted or unsubstituted phenyl-acetic acids, cyclizing the resulting acid amides with dehydrating agents so as to obtain the corresponding 1-benzyl-3,4,5,6,7,8-hexahydroisoquinolines and hydrogenating the latter to the octahydro compounds. The subsequent N-alkylation then yields the 1-benzyl-2-alkyl-1,2,3,4,5,6,7,8-octahydroisoquinolines substituted or unsubstituted in the aromatic ring.

It has now been found, according to the present invention, that the same 1-benzyl-2-alkyl-1,2,3,4,5,6,7,8-octahydroisoquinolines of the general Formula VI and their salts can be obtained by reacting a phenyl-acetyl-halide of the formula

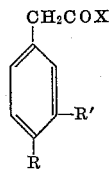

(X=Cl, Br; R and R'=H, OH, OCH₃, OCOCH₃, OCH₂C₆H₅, OCOOC₂H₅)

with 1 - alkylamino - 2 - [cyclohexene - (1') - yl] - ethane (III), cyclizing the thereby resulting amide IV to the corresponding 1-benzylidene-2-alkyl-1,2,3,4,5,6,7,8-octahydroisoquinoline of the general Formula V and hydrogenating the latter in the presence of catalysts.

The new synthesis may be illustrated by the following formulae scheme:

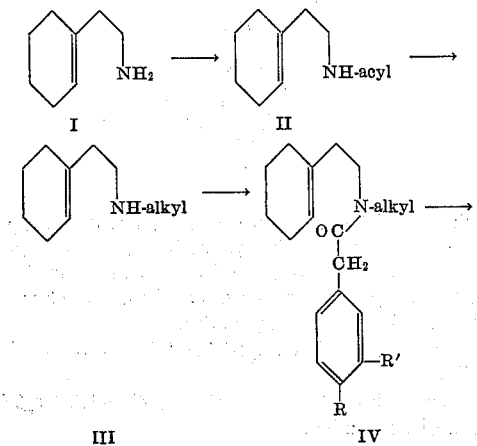

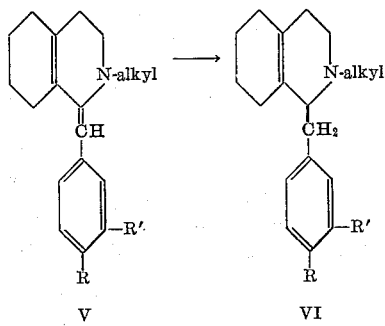

The 1-alkylamino-2-cyclohexene-(1')-yl-ethanes III required as starting materials can, for instance, be obtained by acylation of β-cyclohexene-(1)-yl-ethylamine and subsequent reduction. By reaction with unsubstituted or substituted phenyl-acetyl-halides the secondary amines III are converted into the corresponding phenyl-acetic - N - [cyclohexene - (1) - yl - ethyl] - N - alkyl - amides IV. By treatment with dehydrating agents such as POCl₃ or P₂O₅, the latter compounds are allowed to be cyclized to the unsubstituted or substituted 1-benzylidene-2-alkyl-1,2,3,4,5,6,7,8-octahydroisoquinolines which, when hydrogenated, furnish the corresponding benzyl compounds.

The new synthesis differs in principle from the known method in that the isoquinoline compound V is obtained under formation of a semicyclic double bond. The compounds of the general Formula VI are therefore formed by hydrogenation of a C—C-double bond.

The products of the present process may be used as intermediates for the manufacture of N-alkylmorphinanes.

Example 1

600 parts by weight of methyl-formate are slowly dropped into 125.2 parts by weight of cooled β-cyclohexene - (1) - yl - ethylamine. After the initially rather strong reaction has subdued, the mixture is boiled for an hour.

Excess methyl-formate is evaporated and the remaining 1-formylamino-2-cyclohexene-(1')-yl-ethane distilled in the vacuum of a water-jet pump at 168–171° C. (13 mm.).

45.5 parts by weight of LiAlH₄ are suspended in 2000 parts by volume of absolute ether under nitrogen and with exclusion of moisture. 153.2 parts by weight of 1-formylamino-2-cyclohexene-(1')-yl-ethane in 500 parts by volume of absolute ether are added dropwise, with good stirring, at such a speed that the ether boils gently. When the addition is complete, the mixture is stirred overnight at room temperature and then excess LiAlH₄ destroyed with ethyl acetate. After addition of concentrated NaOH, the LiAl salts settle and the ether solution can be decanted. After repeated shaking of the LiAl salts with ether, the united ether solution is dried with dry potassium carbonate, and the 1-methyl-amino-2-cyclohexene-(1')-yl-ethane distilled in the vacuum of a water-jet pump; boiling point 85–90° C. (15 mm.); melting point of the hydrochloride 140–142° C. (from isopropyl alcohol).

154.6 parts by weight of phenyl-acetic chloride in 450 parts by volume of absolute benzene are dropped at 0° C. into a well-stirred solution of 278.5 parts by weight of 1-methylamino-2-cyclohexene-(1')-yl-ethane in 1400 parts by volume of absolute benzene and allowed to stand for 3 hours at room temperature. The condensation product is successively washed with 3 N hydrochloric acid, water, 3 N soda and water. After distilling off the solvent, the phenyl-acetic-N-[cyclohexene-(1)-yl-ethyl]-N-methyl-amide remains behind as a light-yellow viscous oil which is distillable but also directly employable for further use.

257.3 parts by weight of phenyl-acetic-N-[cyclohexene-(1)-yl-ethyl]-N-methyl-amide are heated with 300.6 parts by weight of phosphorus oxychloride in 1300 parts by volume of absolute benzene for 2 hours at 95° C. and subsequently poured into water. After addition of ether, the phosphoric acid salts are brought into aqueous solution by shaking and the latter repeatedly washed with ether. Concentrated NaOH is then added cautiously to the ice-cold aqueous solution, and the separated base taken up in ether which, after washing with water, is dried and distilled off. The remaining 1-benzylidene-2-methyl-1,2,3,4,5,6,7,8-octahydroisoquinoline is dissolved in ten times the quantity of methanol and hydrogenated in the presence of 60 parts by weight of Raney nickel at room temperature and normal pressure. After the quantity of hydrogen calculated for 1 mol has been taken up, the hydrogenation is stopped and the catalyst filtered off. The residue remaining behind after the evaporation of the methanol represents the 1-benzyl-2-methyl-1,2,3,4,5,6,7,8-octahydroisoquinoline, the hydrochloride of which melts at 195–196° C.

*Example 2*

A solution of 185 parts by weight of p-methoxy-phenyl-acetyl-chloride in 450 parts by volume of absolute benzene is slowly added, with ice-cooling and stirring, to 278 parts by weight of 1-methyl-amino-2-cyclohexene-(1')-yl-ethane in 1400 parts by volume of absolute benzene. The reaction product is then allowed to stand for one hour at room temperature and subsequently heated on a water-bath for 15 minutes. When working up according to Example 1, the p-methoxy-phenyl-acetic-N-(cyclohexenyl-ethyl)-N-methyl-amide is obtained as an oil of light-yellow colouring which can be used without further purification.

287.4 parts by weight of p-methoxy-phenyl-acetic-N-[cyclohexene-(1)-yl-ethyl]-N-methyl-amide are heated with 306 parts by weight of POCl₃ in 1500 parts by volume of benzene for 2 hours at 95° C. The reaction product is then worked up in an analogous manner as described in Example 1. The remaining viscous 1-(p-methoxy - benzylidene) - 2 - methyl - 1,2,3,4,5,6,7,8-octahydroisoquinoline is dissolved in ten times the quantity of methanol and hydrogenated in the presence of 60 parts by weight of Raney nickel. After working up, the 1 - (p - methoxybenzyl) - 2 - methyl - 1,2,3,4,5,6,7,8-octahydroisoquinoline remains behind in the form of an oil which boils at 120° C. at a pressure of 0.01 mm.; melting point of the oxalate 163–164° C. (from alcohol-ether).

*Example 3*

230 parts by weight of phosphorus pentachloride are slowly added to a suspension of 196.2 parts by weight of homoveratric acid in 2000 parts by volume of absolute benzene. After the initially lively reaction has come to a standstill, the mixture is heated for 15 minutes to 60° C. and the benzene subsequently evaporated in the vacuum of a water-jet pump at about 30° C. In order to remove completely the phosphorus oxychloride resulting from the formation of acid chloride, the residue is repeatedly dissolved in benzene and again concentrated in vacuo. The homoveratric acid chloride is then dissolved in 1000 parts by volume of absolute benzene and the solution slowly dropped into a solution of 278 parts by weight of 1-methyl-amino-2-cyclohexene-(1')-yl-ethane in 500 parts by volume of absolute benzene. The reaction and working up according to Example 1 yield the homoveratric acid-N-[cyclohexene-(1)-yl-ethyl]-N-methyl-amide.

317.4 parts by weight of homoveratric acid-N-[cyclohexene-(1)-yl-ethyl]-N-methyl-amide are dissolved in 1000 parts by volume of absolute benzene and 306 parts by weight of POCl₃ are added. The treatment according to Example 1 leads to 1-(3',4'-dimethoxy-benzylidene)-2-methyl-1,2,3,4,5,6,7,8-octahydroisoquinoline which is hydrogenated according to the conditions contained in Example 1 to 1 - (3',4' - dimethoxy-benzyl) - 2 - methyl-1,2,3,4,5,6,7,8-octahydroisoquinoline (boiling point 135° C. at 0.001 mm.). Melting point of the oxalate 125–127° C. (from methanol).

I claim:

1. A 1-benzylidene-2-alkyl-1,2,3,4,5,6,7,8-octahydroisoquinoline of the general formula

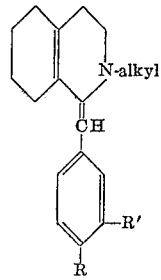

wherein R and R' are selected from the group consisting of hydrogen and hydroxy, methoxy, acetoxy, benzyloxy and carbethoxyoxy radicals.

2. A process of producing a 1-benzylidene-2-alkyl-1,2,3,4,5,6,7,8-octahydroisoquinoline represented by the formula

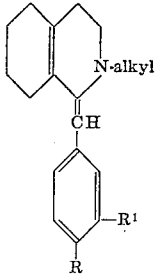

wherein R and R¹ are each selected from the group consisting of hydrogen, hydroxy, methoxy, acetoxy, benzyloxy, and carbethoxyoxy radicals, which comprises treating a phenyl-acetic-N-[cyclohexene-(1)-yl-ethyl]-N-alkyl-amide represented by the formula

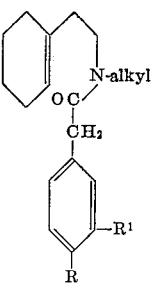

wherein R and R¹ are each selected from the group consisting of hydrogen, hydroxy, methoxy, acetoxy, benzyloxy, and carbethoxyoxy radicals, with a cyclicizing-dehydrating agent of the class consisting of phosphorus oxides and phosphorus oxyhalides.

3. 1-benzylidene-2-methyl-1,2,3,4,5,6,7,8-octahydroisoquinoline.

4. 1-(p-methoxy-benzylidene)-2-methyl-1,2,3,4,5,6,7,8-octahydroisoquinoline.

5. 1 - (3',4' - dimethoxy - benzylidene) - 2 - methyl-1,2,3,4,5,6,7,8-octahydroisoquinoline.

References Cited in the file of this patent

UNITED STATES PATENTS

| | | |
|---|---|---|
| 1,653,314 | Schuloff | Dec. 20, 1927 |
| 2,255,077 | Middleton | Sept. 9, 1941 |
| 2,338,782 | Riester | Jan. 11, 1944 |
| 2,388,663 | Argyle | Nov. 13, 1945 |
| 2,463,942 | Behrens et al. | Mar. 8, 1949 |
| 2,554,842 | Schnider | May 29, 1951 |
| 2,634,272 | Hallerbach | Apr. 7, 1953 |

OTHER REFERENCES

Clarke et al., "The Chemistry of Penicillin" (Princeton University Press, Princeton, N. J., 1949), pp. 660–664.

Grewe, Chem. Ber., p. 281 (1948).

Schnider et al., Helv. Chim Acta, vol. 33, p. 1447.